US009466864B2

(12) United States Patent
Rogozine et al.

(10) Patent No.: US 9,466,864 B2
(45) Date of Patent: Oct. 11, 2016

(54) RF DUPLEXER FILTER MODULE WITH WAVEGUIDE FILTER ASSEMBLY

(71) Applicants: Alexandre Rogozine, Rio Rancho, NM (US); Reddy Vangala, Albuquerque, NM (US); Nam Phan, Rio Rancho, NM (US)

(72) Inventors: Alexandre Rogozine, Rio Rancho, NM (US); Reddy Vangala, Albuquerque, NM (US); Nam Phan, Rio Rancho, NM (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 14/682,271

(22) Filed: Apr. 9, 2015

(65) Prior Publication Data

US 2015/0295294 A1      Oct. 15, 2015

Related U.S. Application Data

(63) Continuation-in-part of application No. 14/289,849, filed on May 29, 2014, now Pat. No. 9,130,256.

(60) Provisional application No. 61/978,107, filed on Apr. 10, 2014.

(51) Int. Cl.
    *H01P 1/213* (2006.01)
    *H01P 7/10* (2006.01)
    (Continued)

(52) U.S. Cl.
    CPC .............. *H01P 1/213* (2013.01); *H01P 1/2002* (2013.01); *H01P 1/2084* (2013.01); *H01P 1/2138* (2013.01); *H01P 7/10* (2013.01); *H04L 5/1461* (2013.01)

(58) Field of Classification Search
    CPC ........ H01P 7/10; H01P 1/2131; H01P 1/213; H01P 1/2002; H01P 1/2138
    USPC ............. 333/134, 135, 219.1, 208, 209, 212
    See application file for complete search history.

(56) References Cited

U.S. PATENT DOCUMENTS 3,737,816 A * 6/1973 Honicke .................. H01P 7/06
                                                    333/209
3,882,434 A   5/1975 Levy
(Continued)

FOREIGN PATENT DOCUMENTS

CN      201898182 U    7/2011
CN      102361113 A    2/2012
(Continued)

OTHER PUBLICATIONS

Ruiz-Cruz J et al: "Rectangular Waveguide Elliptic Filters with Capacitive and Inductive Irises and Integrated Coaxial Excitation", 2005 IEEE MTT-S International Microwave Symposium, Piscataway, NJ, USA, IEEE, (Jun. 12, 2005) pp. 269-272, EP010844740, DOI: 10.1109/MWSYM.2005.1516577, ISBN: 978-0-7803-8846-8 p. 269; figures 1,3.
(Continued)

*Primary Examiner* — Robert Pascal
*Assistant Examiner* — Rakesh Patel
(74) *Attorney, Agent, or Firm* — Daniel Deneufbourg (57) ABSTRACT

An RF duplexer waveguide filter module for the transmission and filtering of TX and RX RF signals comprising a substrate with TX and RX filter assemblies mounted thereon. One or both of the TX and RX filter assemblies comprises an RF waveguide filter assembly including a plurality of blocks of dielectric material coupled together in a side-by-side relationship. Each of the blocks of dielectric material defines at least one slit and at least one internal RF signal transmission window. One or both of the end blocks defines a step and a through-hole terminating in an opening in the step. In one embodiment, the RF duplexer waveguide filter module additionally comprises an RF antenna waveguide filter extending between and coupling the TX and RX filter assemblies to an antenna RF signal transmission line.

15 Claims, 6 Drawing Sheets

(51) Int. Cl.
- *H04L 5/14* (2006.01)
- *H01P 1/20* (2006.01)
- *H01P 1/208* (2006.01)

(56) References Cited

U.S. PATENT DOCUMENTS

| | | | |
|---|---|---|---|
| 3,955,161 A | 5/1976 | MacTurk | |
| 4,246,555 A * | 1/1981 | Williams | H01P 1/208 333/209 |
| 4,396,896 A | 8/1983 | Williams | |
| 4,431,977 A | 2/1984 | Sokola et al. | |
| 4,609,892 A | 9/1986 | Higgins, Jr. | |
| 4,692,726 A | 9/1987 | Green et al. | |
| 4,706,051 A | 11/1987 | Dieleman et al. | |
| 4,733,208 A | 3/1988 | Ishikawa et al. | |
| 4,742,562 A | 5/1988 | Kommrusch | |
| 4,800,348 A | 1/1989 | Rosar et al. | |
| 4,806,889 A | 2/1989 | Nakano et al. | |
| 4,837,535 A | 6/1989 | Konishi et al. | |
| 4,940,955 A | 7/1990 | Higgins, Jr. | |
| 4,963,844 A | 10/1990 | Konishi et al. | |
| 4,996,506 A | 2/1991 | Ishikawa et al. | |
| 5,004,992 A | 4/1991 | Grieco et al. | |
| 5,023,944 A | 6/1991 | Bradley | |
| 5,130,682 A | 7/1992 | Agahi-Kesheh | |
| 5,208,565 A | 5/1993 | Sogo et al. | |
| 5,243,309 A * | 9/1993 | L'Ecuyer | H01P 1/208 333/209 |
| 5,285,570 A | 2/1994 | Fulinara | |
| 5,288,351 A | 2/1994 | Hoang et al. | |
| 5,365,203 A | 11/1994 | Nakamura et al. | |
| 5,382,931 A | 1/1995 | Piloto et al. | |
| 5,416,454 A | 5/1995 | McVetty | |
| 5,525,946 A | 6/1996 | Tsujiguchi et al. | |
| 5,528,204 A | 6/1996 | Hoang et al. | |
| 5,528,207 A | 6/1996 | Ito | |
| 5,537,082 A | 7/1996 | Tada et al. | |
| 5,572,175 A | 11/1996 | Tada et al. | |
| 5,602,518 A | 2/1997 | Clifford, Jr. et al. | |
| 5,719,539 A | 2/1998 | Ishizaki et al. | |
| 5,731,751 A | 3/1998 | Vangala | |
| 5,821,836 A | 10/1998 | Katehi et al. | |
| 5,850,168 A | 12/1998 | McVetty et al. | |
| 5,926,078 A | 7/1999 | Hino et al. | |
| 5,926,079 A | 7/1999 | Heine et al. | |
| 5,929,726 A | 7/1999 | Ito et al. | |
| 5,999,070 A | 12/1999 | Endo | |
| 6,002,306 A | 12/1999 | Arakawa et al. | |
| 6,016,091 A * | 1/2000 | Hidaka | H01P 1/2084 333/202 |
| 6,023,207 A | 2/2000 | Ito et al. | |
| 6,137,383 A | 10/2000 | De Lillo | |
| 6,154,106 A | 11/2000 | De Lillo | |
| 6,160,463 A | 12/2000 | Arakawa et al. | |
| 6,181,225 B1 | 1/2001 | Bettner | |
| 6,255,921 B1 | 7/2001 | Arakawa et al. | |
| 6,281,764 B1 | 8/2001 | Arakawa et al. | |
| 6,329,890 B1 | 12/2001 | Brooks et al. | |
| 6,351,198 B1 | 2/2002 | Tsukamoto et al. | |
| 6,437,655 B1 | 8/2002 | Andoh et al. | |
| 6,504,446 B1 | 1/2003 | Ishihara et al. | |
| 6,535,083 B1 | 3/2003 | Hageman et al. | |
| 6,549,095 B2 | 4/2003 | Tsukamoto et al. | |
| 6,559,740 B1 | 5/2003 | Schulz et al. | |
| 6,568,067 B2 | 5/2003 | Takeda | |
| 6,594,425 B2 | 7/2003 | Tapalian et al. | |
| 6,677,837 B2 | 1/2004 | Kojima et al. | |
| 6,757,963 B2 | 7/2004 | Meier et al. | |
| 6,791,403 B1 | 9/2004 | Tayrani et al. | |
| 6,801,106 B2 | 10/2004 | Ono et al. | |
| 6,834,429 B2 | 12/2004 | Blair et al. | |
| 6,844,861 B2 | 1/2005 | Peterson | |
| 6,888,973 B2 | 5/2005 | Kolodziejski et al. | |
| 6,900,150 B2 | 5/2005 | Jacquin et al. | |
| 6,909,339 B2 | 6/2005 | Yonekura et al. | |
| 6,909,345 B1 | 6/2005 | Salmela et al. | |
| 6,927,653 B2 | 8/2005 | Uchimura et al. | |
| 6,977,560 B2 | 12/2005 | Iroh et al. | |
| 6,977,566 B2 | 12/2005 | Fukunaga | |
| 7,009,470 B2 | 3/2006 | Yatabe et al. | |
| 7,068,127 B2 | 6/2006 | Wilber et al. | |
| 7,132,905 B2 | 11/2006 | Sano | |
| 7,142,074 B2 | 11/2006 | Kim et al. | |
| 7,170,373 B2 | 1/2007 | Ito et al. | |
| 7,271,686 B2 | 9/2007 | Yoshikawa et al. | |
| 7,323,954 B2 | 1/2008 | Lee et al. | |
| 7,449,979 B2 | 11/2008 | Koh et al. | |
| 7,545,235 B2 | 6/2009 | Mansour et al. | |
| 7,659,799 B2 | 2/2010 | Jun et al. | |
| 7,714,680 B2 | 5/2010 | Vangala et al. | |
| 8,008,993 B2 | 8/2011 | Milson et al. | |
| 8,072,294 B2 | 12/2011 | Tanpo et al. | |
| 8,171,617 B2 | 5/2012 | Vangala | |
| 8,284,000 B2 | 10/2012 | Fukunaga | |
| 8,314,667 B2 | 11/2012 | Uhm et al. | |
| 8,823,470 B2 | 9/2014 | Vangala | |
| 9,130,255 B2 | 9/2015 | Rogozine et al. | |
| 9,130,256 B2 | 9/2015 | Rogozine et al. | |
| 9,130,257 B2 | 9/2015 | Vangala | |
| 9,130,258 B2 | 9/2015 | Vangala et al. | |
| 2001/0024147 A1 | 9/2001 | Arkawa et al. | |
| 2002/0024410 A1 | 2/2002 | Guglielmi et al. | |
| 2003/0006865 A1 | 1/2003 | Kim et al. | |
| 2004/0000968 A1 | 1/2004 | White et al. | |
| 2004/0056737 A1 | 3/2004 | Carpintero et al. | |
| 2004/0129958 A1 | 7/2004 | Koh et al. | |
| 2004/0257194 A1 | 12/2004 | Casey et al. | |
| 2005/0057402 A1 | 3/2005 | Ohno et al. | |
| 2007/0120628 A1 | 5/2007 | Jun et al. | |
| 2009/0015352 A1 | 1/2009 | Goebel et al. | |
| 2009/0102582 A1 | 4/2009 | Van Der Heijden et al. | |
| 2009/0146761 A1 | 6/2009 | Nummerdor | |
| 2009/0201106 A1 | 8/2009 | Iio et al. | |
| 2009/0231064 A1 | 9/2009 | Bates et al. | |
| 2010/0024973 A1 | 2/2010 | Vangala | |
| 2010/0253450 A1 | 10/2010 | Kim et al. | |
| 2011/0032050 A1 * | 2/2011 | Kouki | H01P 1/2135 333/132 |
| 2011/0279200 A1 | 11/2011 | Vangala | |
| 2012/0229233 A1 | 9/2012 | Ito | |
| 2012/0286901 A1 | 11/2012 | Vangala | |
| 2013/0214878 A1 | 8/2013 | Gorisee et al. | |

FOREIGN PATENT DOCUMENTS

| | | |
|---|---|---|
| DE | 102008017967 A1 | 10/2009 |
| EP | 0322993 A2 | 7/1989 |
| EP | 0322993 A3 | 4/1990 |
| EP | 0444948 A2 | 3/1991 |
| EP | 0757401 A2 | 2/1997 |
| EP | 0859423 A1 | 8/1998 |
| EP | 1024548 A1 | 2/2000 |
| EP | 0997964 A2 | 5/2000 |
| EP | 0997964 A3 | 9/2001 |
| EP | 1439599 A1 | 7/2004 |
| FR | 2318512 A1 | 2/1977 |
| JP | 62038601 | 2/1987 |
| JP | 2003298313 | 10/2003 |
| WO | 9509451 | 4/1995 |
| WO | 0024080 | 4/2000 |
| WO | 0038270 A1 | 6/2000 |
| WO | 20055091427 | 9/2005 |

OTHER PUBLICATIONS

Paul Wade: "Rectangular Waveguide to Coax Transition Design", QEX, Nov./Dec. 2006, pp. 10-17, published by American Radio Relay League, Newington, Connecticut, US.

Yoji Isota, Moriyasu Miyazaki, Osami Ishida, Fumio Takeda, Mitsubishi Electric Corporation. "A Grooved Monoblock Comb-Line Filter Suppressing the Third Harmonics", IEEE 1987 MTT-S Digest, pp. 383-386, published by IEEE, New York, New York, US.

(56) References Cited

OTHER PUBLICATIONS

C. Choi, Fig. 2.13, Monolithic Plated Ceramic Waveguide Filters, Mar. 31, 1986, Motorola, Inc., Schaumburg, Illinois, U.S.

Kocbach J. et al: "Design Procedure for Waveguide Filters with Cross-Couplings", 2002 IEEE MTT-S International Microwave Symposium Digest (Cat. No. 02CH37278) IEEE Piscataway, NJ, USA; IEEE MTT-S International Microwave Symposium, IEEE, Jun. 2, 2002, pp. 1449-1452, XP001113877, DOI: 10.1109/WMSYM.2002.1012128 ISBN: 978-0-8703-7239-9 abstract; figure 1.

N. Marcuvitz, Waveguide Handbook, McGraw-Hill Book Co., New York City, Ch. 5, 1951.

Y. Konishi, "Novel dielectric waveguide components—microwave applications of new ceramic materials," Proc. IEEE, vo. 79, pp. 726-740, Jun. 1991.

K. Sano, "Dielectric waveguide filter with low profile and low insertion loss," IEEE Trans. on Microwave Theory & Tech., vol. 47, pp. 2299-2303, Dec. 1999.

K. Sano and T. Yoneyama, "A transition from Microstrip to Dielectric Filled Rectangular Waveguide in Surface Mounting," IEEE MTT-S Int. Microwave Symp. Digest, pp. 813-816, 2002.

I. Awai, A.C. Kundu, and T. Yamashita, "Equivalent circuit representation and explanation of attenuation poles of a dual-mode dielectric resonator bandpass filter," IEEE Trans. Microwave Theory & Tech., vol. 46, pp. 2159-2163, Dec. 1998.

A.D. Lapidus and C. Rossiter, "Cross-coupling in microwave bandpass filters," Microwave Journal, pp. 22-46, Nov. 2004.

Tze-min Shen; Chi-Feng Chen' Huang, Ting-Yi; Wu, Ruey-Beei, "Design of Vertically Stacked Waveguide Filters in LTCC," Microwave Theory and Techniques, IEEE Transactions on, vol. 55, No. 8, pp. 1771,1779, Aug. 2007.

Hung-Yi Chien; Tze-Min Shen; Huang; Ting-Yi; Wei-Hsin Wang; Wu, Ruey-Beei, "Miniaturized Bandpass Filters with Double-Folded Substrate Integrated Resonators in LTCC," Microwave Theory and Techniques, IEEE Transactions on vol. 57, No. 7, pp. 1774, 1782, Jul. 2009.

Bo-Jiun Chen; Tze-Min Shen; Wu, Ruey-Beei, "Dual Band Vertically Stacked Laminated Waveguide Filter Design in LTCC Technology," Microwave Theory and Techniques, IEEE Transactions on, vol. 57, No. 6, pp. 1554, 1562, Jun. 2009.

Wolfram Wersing, Microwave ceramics for resonators and filters, Current Opinion in Solid State and Materials Science, vol. 1, Issue 5, Oct. 1996, pp. 715-731, ISSN 1359-0286.

Shen T et al, Full-Wave Design of Canonical Waveguide Filters by Optimation, 2001 IEEE MTT-S International Microwave Symposium Digest. (IMS 2001) Phoenix, AZ, May 20-25, 2001, pp. 1487-1490.

John David Rhodes, The Generalized Direct-Coupled Cavity Linear Phase Filter, IEEE Transactions on Microwave Theory and Techniques, vol. MTT-18, No. 6, Jun. 1, 1970 (Jun. 1, 1970), pp. 308-313, XP001401320, abstract.

\* cited by examiner

RF DUPLEXER FILTER MODULE WITH WAVEGUIDE FILTER ASSEMBLY

CROSS-REFERENCE TO RELATED AND CO-PENDING APPLICATIONS

This application is a continuation-in part patent application which claims the benefit of the filing date of co-pending U.S. patent application Ser. No. 14/289,849 filed on May 29, 2014, the contents of which are incorporated herein by reference as are all references cited therein.

This application also claims the benefit of the filing date and disclosure of U.S. Provisional Patent Application Ser. No. 61/978,107 filed on Apr. 10, 2014, the contents of which are incorporated herein by reference as are all references cited therein.

FIELD OF THE INVENTION

The invention relates generally to an RF duplexer filter module and, more specifically, to an RF duplexer filter module with one or more RF dielectric waveguide filter assemblies mounted on a substrate.

BACKGROUND OF THE INVENTION

Radio-frequency (RF) duplexer filter modules provide for the transmission, reception, and filtering of RF TX and RX signals.

The present invention is directed to a radio-frequency (RF) duplexer module that incorporates new RF dielectric ceramic waveguide filter assemblies.

SUMMARY OF THE INVENTION

The present invention is generally directed to an RF duplexer filter module for the transmission and filtering of an RF signal comprising a substrate defining opposed exterior top and bottom surfaces and including respective TX, RX, and antenna input/output RF signal transmission lines, a TX filter mounted on the top surface of the substrate and extending between and coupled to the TX and antenna input/output RF signal transmission lines, and an RX filter mounted on the top surface of the substrate and extending between and coupled to the RX and antenna input/output RF signal transmission lines, wherein at least one of the TX and RX filters is an RF waveguide filter.

In one embodiment, the RF waveguide filter is an RF waveguide filter assembly including a plurality of waveguide filter blocks that have been coupled together in a relationship wherein the RF signal is transmitted through the RF waveguide filter in a generally serpentine pattern.

In one embodiment, the RF waveguide filter assembly includes a pair of end RF signal input/output blocks and one or more interior RF signal transmission blocks located between the pair of end RF signal input/output blocks.

In one embodiment, each of the end RF signal input/output blocks and each of the interior RF signal transmission blocks defines a slot.

In one embodiment, at least one of the end RF signal input/output blocks defines a step and an RF signal transmission through-hole terminating in an opening in the step.

In one embodiment, an RF antenna waveguide filter extends between the TX and RX filters and coupling the TX and RX filters to the RF antenna input/output RF signal transmission line.

In one embodiment, the RF antenna waveguide filter defines a step and an RF signal transmission through-hole terminating in an opening in the step.

In one embodiment, the RF antenna waveguide filter is T-shaped and the step is defined in the base of the T-shaped RF antenna waveguide filter.

The present invention is also directed to an RF waveguide duplexer filter module adapted for the transmission and filtering of an RF signal comprising a substrate including opposed top and bottom exterior surfaces and including respective TX, RX, and antenna input/output RF signal transmission lines, and respective RF TX and RX waveguide filter assemblies mounted on the top exterior surface of the substrate and coupled to the respective TX, RX and antenna input/output RF signal transmission lines, each of the RF TX and RX waveguide filter assemblies including a plurality of blocks of dielectric material each defining at least a first slit and at least a first internal RF signal transmission window and being coupled in a side-by-side relationship wherein the internal RF signal transmission windows are aligned with each other to define a generally serpentine path for the transmission of the RF signal through the respective RF TX and RX waveguide filter assemblies.

In one embodiment, each of the RF TX and RX waveguide filter assemblies includes a pair of end blocks and one or more interior blocks, one or both of the pair of end blocks also defining a step and a through-hole terminating in an opening in the step.

In one embodiment, both of the pair of end blocks define the step and the through-hole.

In one embodiment, only one of the pair of end blocks defines the step and the through-hole, and further comprising an RF antenna waveguide filter extending between the TX and RX waveguide filter assemblies and coupling the TX and RX waveguide filter assemblies to the RF antenna input/output RF signal transmission line.

In one embodiment, the RF antenna waveguide filter defines a step and an RF signal transmission through-hole terminating in an opening in the step.

In one embodiment, the RF antenna waveguide filter is T-shaped and the step is defined in the base of the T-shaped RF antenna waveguide filter.

The present invention is also directed to an RF waveguide filter assembly for the transmission and filtering of an RF signal comprising a pair of end blocks of dielectric material, each of the end blocks including opposed top and bottom exterior surfaces and opposed side exterior surfaces, at least one of the pair of end blocks of dielectric material defining a step and a through-hole terminating in an opening in the step, the pair of end blocks each also defining at least a first slit extending into one of the opposed exterior surfaces and at least a first RF signal transmission window defined in one of the opposed side exterior surfaces, and one or more interior blocks of dielectric material, each of the interior blocks including opposed top and bottom exterior surfaces and opposed side exterior surfaces, the one or more of the interior blocks each defining a slit extending into one of the opposed exterior side surfaces of the interior block and an RF signal transmission window defined in each of the opposed exterior side surfaces, wherein the pair of end blocks and the one or more interior blocks are coupled together in a side-by-side relationship with the respective RF signal transmission windows in alignment with each other to define a generally serpentine path for the transmission of the RF signal through the RF waveguide filter assembly.

In one embodiment, a substrate defines respective RF signal antenna, TX, and RX transmission lines, the RF waveguide filter assembly comprising respective TX and RX waveguide filter assemblies mounted on the substrate and coupled to the RF signal antenna, TX, and RX transmission lines on the substrate and defining an RF duplexer waveguide filter module.

Other advantages and features of the present invention will be more readily apparent from the following detailed description of the preferred embodiment of the invention, the accompanying drawings, and the appended claims.

BRIEF DESCRIPTION OF THE DRAWINGS

These and other features of the invention can best be understood by the following description of the accompanying FIGURES as follows.

DETAILED DESCRIPTION OF THE EMBODIMENTS

Figure 1:
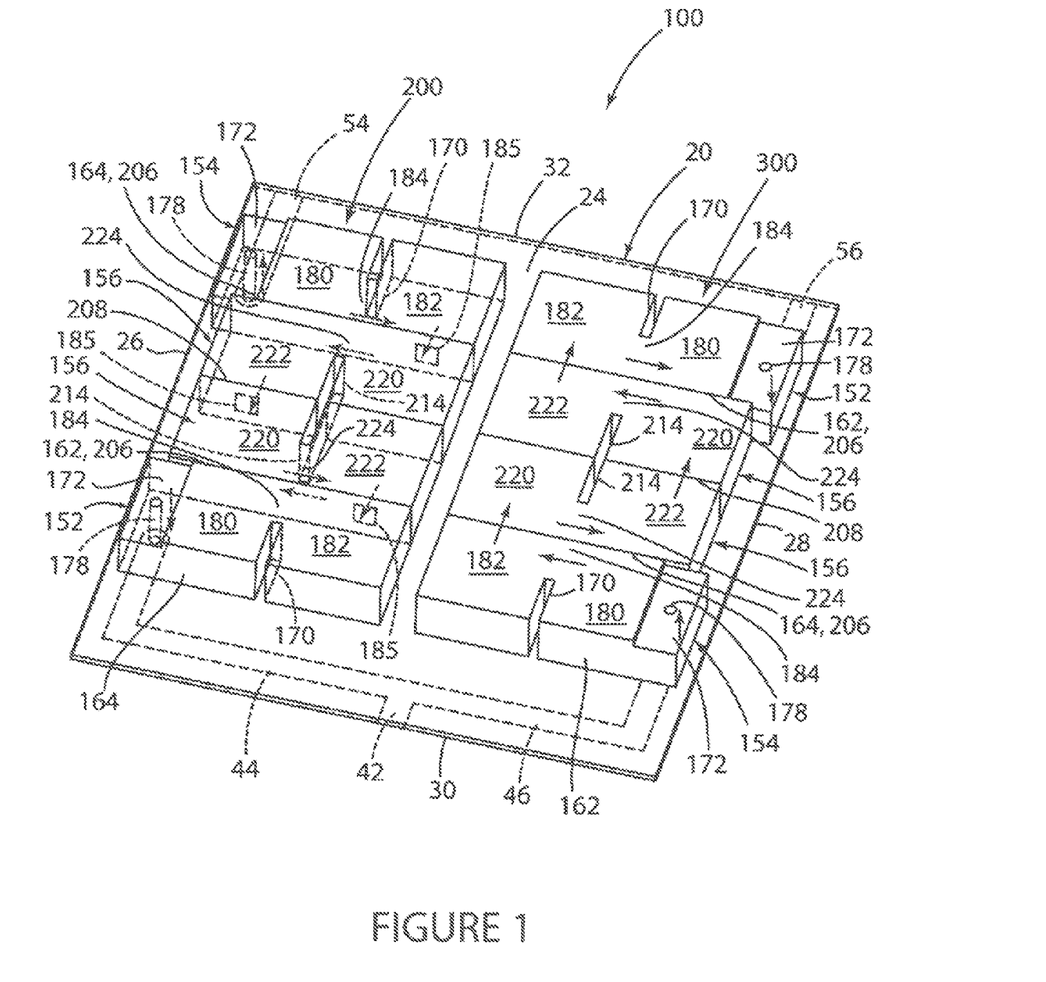
FIG. 1 is an enlarged perspective part phantom view of an RF duplexer waveguide filter module in accordance with the present invention.
Figure 2:
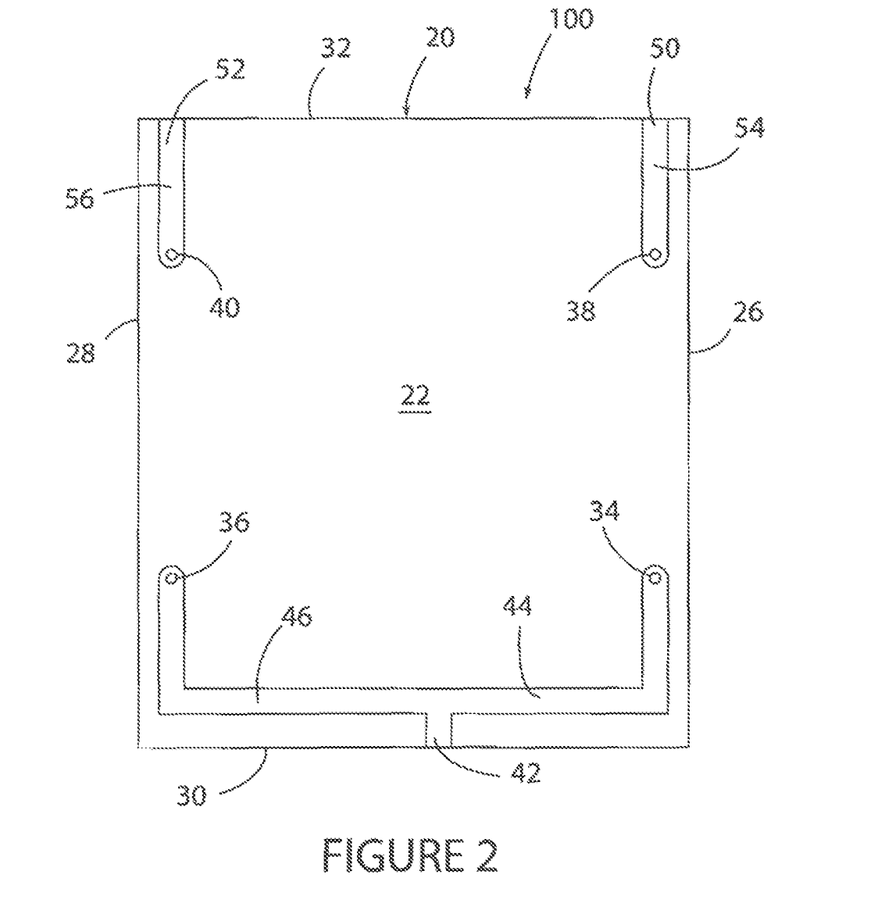
FIG. 2 is an enlarged bottom plan view of the RF duplexer waveguide filter module shown in FIG. 1.

FIGS. 1 and 2 depict a first embodiment of a radio-frequency (RF) duplexer dielectric ceramic waveguide filter module 10 in accordance with the present invention.

In the embodiment shown, the RF duplexer waveguide filter module 100 is comprised of a substrate 20, which in the embodiment shown is in the form of a printed circuit board, and a pair of radio-frequency (RF) dielectric ceramic waveguide filter assemblies 200 and 300 mounted on the top surface 24 of the substrate 20 as described in more detail below.

The printed circuit board 20, which may be of any suitable construction, includes opposed exterior bottom and top horizontal surfaces 22 and 24, opposed elongate longitudinal side vertical surfaces or edges 26 and 28, and opposed elongate transverse side vertical surfaces or edges 30 and 32 together defining a generally rectangular shaped printed circuit board 20. The printed circuit board 20 also includes a plurality of RF signal input/output pads, RF signal transmission lines, and RF signal transmission through-holes formed and defined therein as described in more detail below.

In the embodiment shown, the printed circuit board 20 includes and defines four RF TX (transmit) and RX (receive) signal transmission through-holes 34, 36, 38, and 40 (FIG. 2) extending through the body of the printed circuit board 20 in a relationship normal to the bottom and top exterior surfaces 22 and 24 and terminating in respective openings in the opposed exterior surfaces 22 and 24. The pair of RF signal transmission through-holes 34 and 36 are positioned in a spaced-apart and co-linear relationship adjacent the respective longitudinal side edges 26 and 28 and spaced from the transverse side edge 30 of the printed circuit board 20. The pair of RF signal transmission through-holes 38 and 40 are positioned and oriented in a spaced-apart and co-linear relationship diametrically opposed to the pair of RF signal transmission through-holes 34 and 36 and, more specifically, in a relationship adjacent the respective longitudinal side edges 26 and 28 and spaced from the opposed transverse side edge 32.

In the embodiment as shown in FIG. 2, the printed circuit board 20 also includes an RF antenna signal input/output pad 42 and a pair of RF signal transmission lines 44 and 46 formed and located on the lower exterior surface 22 of the printed circuit board 20. The RF antenna signal input/output pad 42 is generally centrally located along the transverse side edge 30 of the printed circuit board 20. The RF TX signal transmission line 44 extends between the opening defined in the board 20 by the through-hole 34 and the RF antenna signal input/output pad 42. The RF RX signal transmission line 46 extends between the opening defined in the board 20 by the through-hole 36 and the RF antenna signal input/output pad 42.

The printed circuit board 20 further includes a pair of additional RF TX and RX signal input/output pads 50 and 52 and RF TX and RX signal transmission lines 54 and 56 formed and located on the lower exterior surface 22 of the printed circuit board 20. The RF TX and RX signal input/output pads 50 and 52 are located in a spaced-apart relationship along the transverse side edge 32 of the board 20 with the RF TX signal input/output pad 50 located adjacent the longitudinal side edge 26 of the board 20 and the RF RX signal input/output pad 52 located adjacent the longitudinal side edge 28 of the board 20. The RF TX signal transmission line 54 extends between the RF TX signal input/output pad 50 and the opening defined in exterior surface 22 by the through-hole 38 defined in the board 20 while the RF RX signal transmission line 56 extends between the RF RX signal input/output pad 52 and the opening defined in the exterior surface 22 by the through-hole 40 defined in the board 20.

The RF waveguide filter module 10 still further comprises the pair of respective TX and RX RF ceramic dielectric waveguide filter assemblies 200 and 300 mounted on the top exterior surface 24 of the printed circuit board 20.

In the embodiment shown, each of the waveguide filter assemblies 200 and 300 includes a pair of RF signal input/output blocks 152 and 154 and a pair of RF signal transmission blocks 156 wherein the blocks 152, 154, and 156 have been coupled and joined together in a side-by-side relationship wherein the pair of blocks 152 and 154 comprise the end RF signal input/output transmission blocks and the pair of blocks 156 comprise the two interior RF signal transmission blocks sandwiched and located between the end blocks 152 and 154.

The waveguide filter assemblies 200 and 300 are located and mounted on the top exterior surface 24 of the board 20 in a spaced-apart and parallel relationship to each other and the two longitudinal side edges 26 and 28 of the board 20 with the waveguide filter assembly 200 located adjacent, spaced and parallel to the longitudinal side edge 26 and extending between and coupled to and overlying the RF signal transmission through-holes 34 and 38 and the waveguide filter assembly 300 located adjacent, spaced and parallel to the longitudinal side edge 28 and extending between and coupled to and overlying the RF signal transmission through-holes 36 and 40 defined and extending through the printed circuit board 20. Still more specifically, the RF signal input/output blocks 152 and 154 of the waveguide filter assembly 200 are coupled to the respective RF signal transmission through-holes 34 and 38 in the printed circuit board 20 and the RF signal input/output blocks 152 and 154 of the waveguide filter assembly 300 are coupled to the respective RF signal transmission through-holes 36 and 40 in the printed circuit board 20.

Each of the RF TX and RX signal transmission waveguide filters 200 and 300 and the respective blocks 152, 154, 156 is similar in structure and function to the waveguide filter and respective blocks thereof disclosed in US Patent Application Publication No. 2014-0266514 A1 published on May 29, 2014, the contents and disclosure of which is incorporated herein by reference.

Thus, in the embodiment as shown in detail in FIGS. 3 and 4, each of the RF signal input/output waveguide filter blocks 152 and 154 is identical in structure except as otherwise described in more detail below and is each made from a generally parallelepiped shaped solid block of dielectric ceramic material that includes a pair of opposed exterior bottom and top horizontal faces or surfaces 160, a pair of opposed longitudinal exterior vertical side faces or surfaces 162 and 164, and a pair of transverse vertical end exterior side faces or surfaces 166 and 168.

Each of the RF signal input/output waveguide filter blocks 152 and 154 also defines a slit or slot 170.

In the filter block 152 (FIG. 4), the slit or slot 170 is defined and extends from the longitudinal side face 164 and into the body of the block 152 and 154. In the embodiment shown, the slit or slot 170 is centrally located in the longitudinal side face 164, extends the full height of the block 152 and defines respective openings in the top and bottom exterior surfaces 160, extends into the body of the block 152 in a relationship generally normal to the longitudinal side surfaces 162 and 164, and extends into the block 152 a distance approximately half the width of the block 152.

In the filter block 154 (FIG. 3), the slit or slot 170 is defined and extends from the opposed longitudinal side face 162 and into the body of the block 154. In the embodiment shown, the slit or slot 170 is centrally located in the longitudinal side face 162, extends the full height of the block 154 and defines respective openings in the top and bottom exterior surfaces 160, extends into the body of the block 154 in a relationship generally normal to the longitudinal side surfaces 162 and 164, and extends into the block 154 a distance approximately half the width of the block 154.

Each of the blocks 152 and 154 also includes a step 172 located and extending along the transverse side face 166 of each of the blocks 152 and 154. In the embodiment shown, the step 172 comprises a portion of the respective blocks 152 and 154 from which a section or layer of dielectric ceramic material is absent or has been removed from the top exterior face or surface 162 of the respective blocks 152 and 154. In the embodiment shown, the generally L-shaped step 172 extends the full width of each of the respective blocks 152 and 154 between the longitudinal side faces 162 and 164 and includes a horizontal and transversely extending surface or face 174 spaced from the top exterior surface 160 of the respective blocks 152 and 154 and extending the full width of the respective blocks 152 and 154, and a vertical and transversely extending face or surface 176 also extending the full width of each of the respective blocks 152 and 154 between the longitudinal side faces 162 and 164 and positioned and oriented in a relationship spaced from and parallel to the transverse side surface or face 166 of the respective blocks 152 and 154. The horizontal and vertical surfaces 174 and 176 terminate into each other to define a generally L-shaped shoulder in each of the blocks 152 and 154.

Stated another way, the step 172 comprises a stepped in or recessed end region or portion or shoulder in each of the respective blocks 152 and 154 having a height less than the height of the remainder of the respective blocks 152 and 154.

Further, and although not shown, it is understood that the step 172 could likewise comprise a step out portion or raised or domed region of the respective blocks 152 and 154 having a height greater than the height of the remainder of the respective blocks 152 and 154.

Each of the blocks 152 and 154 further includes and defines an RF signal transmission input/output through-hole 178 extending through the interior of the respective blocks 152 and 154. The through-hole 178 is located in the step 172 and is oriented in a relationship generally normal with the bottom and top exterior surfaces 160 of the respective blocks 152 and 154 and terminating in respective openings in the surface 174 of the step 170 and the bottom exterior surface 160 of the respective blocks 152 and 154.

In the embodiment shown, the vertical face or surface 176 of the step 172 is located between and spaced from both the through-hole 178 and the slit or slot 170 and extends in a relationship generally parallel to the slit or slot 170.

The ceramic material of each of the respective blocks 152 and 154 in combination with the slit or slot 170 defines a pair of resonant sections 180 and 182 (also referred to as cavities or cells or resonators) in each of the respective blocks 152 and 154 which are separated from each other by the slit or slot 170, and also an RF signal transmission bridge 184 of dielectric material extending between the resonators 180 and 182. The bridge 184 is defined by the portion of the ceramic material of the respective blocks 152 and 154 located between the end of the slit or slot 170 and the respective longitudinal side faces 162 and 164 of the respective blocks 152 and 154.

All of the external surfaces of the respective blocks 152 and 154 and the internal surfaces of the RF signal transmission input/output through-hole 178 are covered with a suitable conductive material, such as for example silver, with the exception of respective uncoated (exposed ceramic) regions on the block bottom surface 160 which surround respective coated regions surrounding the opening defined in the bottom block surface 160 by the through-hole 178 and respective uncoated (exposed ceramic) regions or windows 185 defined on the longitudinal side face or surface 162 and 164 of the respective blocks 152 and 154.

Specifically, each of the longitudinal side surface 162 and 164 of each of the respective blocks 152 and 154 respectively includes a generally square shape uncoated (exposed ceramic) region defining an internal RF signal transmission window 185. The window 185 is located adjacent and spaced from the transverse side face 168 of each of the respective blocks 152 and 154 and, more specifically, is located and defined in the resonant section 182 of the respective blocks 152 and 154 located and defined between the transverse side face 168 and the slit 170.

Thus, the pair of blocks 152 and 154 are identical in structure with the step 172 defined in the end transverse side face 166; the through-hole 178 terminating in the step 172; the slit 170 centrally located in the blocks 152 and 154 between and in a relationship parallel to the transverse side faces 166 and 168; the horizontal surface 174 of the step 172 terminating in the vertical surface 176 of the step 172; the vertical surface 176 of the step 172 being located between the end transverse side face 166 and the slit 170; the RF signal transmission window 185 being defined and located in the region of the longitudinal side faces 162 and 164 between the slit 170 and the opposed end transverse side face 168; and the slit 170 and the window 185 located and defined in an opposed relationship in the opposed longitudinal vertical side faces 162 and 164.

As discussed above, the pair of blocks 152 and 154 differ only in that, in the block 152, the slit 170 and the window 185 are defined in the longitudinal faces 164 and 162 respectively while, in the block 154, the slit 170 and the window 185 are defined in the longitudinal faces 162 and 164 respectively.

Figures 3, 4, 5:
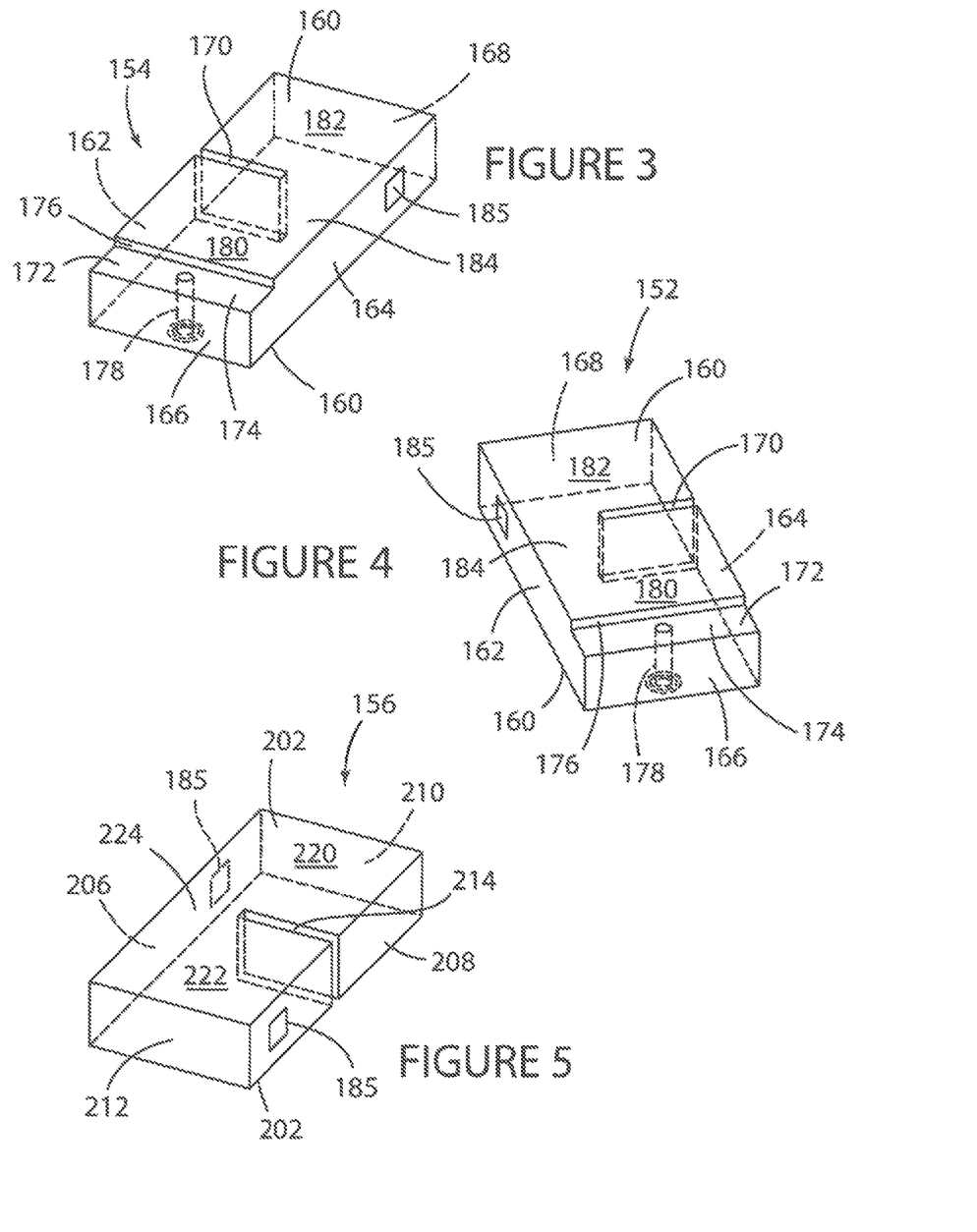
FIG. 3 is an enlarged perspective view of one of the end RF signal input/output transmission filter blocks of the RF waveguide TX and RX filters of the RF duplexer waveguide filter module shown in FIG. 1.
FIG. 4 is an enlarged perspective view of one of the interior RF signal transmission blocks of the RF waveguide TX and RX filters of the RF duplexer waveguide filter module shown in FIG. 1.
FIG. 5 is an enlarged perspective view of the other of the end RF signal input/output transmission blocks of the RF waveguide TX and RX filters of the RF duplexer waveguide filter module shown in FIG. 1.

Each of the internal RF signal transmission blocks 156 is identical in structure and, as shown in FIG. 5, is made from a generally parallelepiped shaped solid block of dielectric ceramic material that includes a pair of opposed exterior bottom and top horizontal faces or surfaces 202, a pair of opposed longitudinal exterior vertical side faces or surfaces 206 and 208, and a pair of transverse end exterior vertical side faces or surfaces 210 and 212.

A slit or slot 214 is defined and extends from the longitudinal side face 208 of the block 156. In the embodiment shown, the slit or slot 214 is centrally located in the longitudinal side face 208, extends the full height of the block 156 and defines respective openings in the bottom and top exterior surfaces 202, extends in a relationship generally normal to the longitudinal side surfaces 206 and 208, and extends into the body of the block 156 a distance approximately half the width of the block 156.

The ceramic material of the block 156 in combination with the slit or slot 214 defines a pair of resonant sections 220 and 222 (also referred to as cavities or cells or resonators) in the block 156 which are separated from each other by the slit or slot 214, and also an RF signal transmission bridge 224 between the resonators 220 and 222. The bridge 224 is defined by the portion of the ceramic material of the block 156 located between the end of the slit or slot 214 and the longitudinal side face 208 of the block 156.

All of the external surfaces of the block 156 are covered with a suitable conductive material, such as for example silver, with the exception of respective uncoated (exposed ceramic) regions or windows defined on the respective opposed longitudinal side faces or surfaces 206 and 208 of the respective blocks 156 and 158.

Specifically, each of the opposed longitudinal side surfaces or surfaces 206 and 208 of the block 156 includes a generally square shape uncoated (exposed ceramic) region defining an RF signal transmission window 185. The windows 185 are located at opposite ends of the block 156 in a relationship adjacent and spaced from the respective transverse side edges 210 and 212 of the block 156. Thus, in the embodiment shown, the block 156 includes a pair of windows 185 located at opposite corners of the opposed transverse side vertical faces 206 and 208 of the block 156 with one of the windows 185 located in the longitudinal vertical side face 206 between the transverse side vertical end face 210 and the slit 214 and in the region of the resonant section 220 while the other of the windows 185 is located in the opposed longitudinal vertical side face 208 between the opposed transverse side vertical end face 212 and the slit 214 and in the region of the opposed resonant section 222.

In accordance with the embodiment of FIGS. 1 and 2, the respective blocks 152, 154, and 156 of the respective waveguide filter assemblies 200 and 300 are oriented and coupled together in a side-by-side and abutting relationship with the respective internal transmission windows 185 in alignment and abutting relationship with each other so as to allow the transmission and passage of the RF signal through each of the respective waveguide filter assemblies 200 and 300 in the general serpentine pattern as shown in FIG. 1.

Specifically, the respective blocks 152, 154 and 156 are coupled together to form the RF TX signal transmission waveguide filter assembly 200, shown in FIG. 1 in phantom for illustration purposes, in a manner wherein: the end RF input/output block 152 is seated on the top surface 24 of the board 20 in a relationship normal and spaced from the longitudinal side edge 26 of the board 20 with the input/output pad surrounding the opening defined in the bottom surface 160 of the block 152 by the through-hole 178 seated against the respective input/output pad (not shown) defined in the top surface 24 of the board 20 which in turn is coupled to the RF antenna signal transmission line 44 on the bottom surface 22 of the board 20; the one of the interior blocks 156 is seated on the top surface 24 of the board 20 with the longitudinal vertical side face 206 thereof abutted against the longitudinal vertical side face 162 of the end block 152 with the window 185 on the one of the interior blocks 156 abutted against the window 185 on the end block 152; the other of the interior blocks 156 seated on the top surface 24 of the board 20 with the longitudinal vertical side face 208 thereof abutted against the longitudinal vertical side face 208 of the one of the interior blocks 156 with the slit 214 on the one of the interior blocks 156 in alignment with the slit 214 on the other of the interior blocks 156 and the window 185 on the one of the interior blocks 156 in alignment and abutted against the window 185 on the other of the interior blocks 156; and the opposed end RF signal input/output block 154 seated against the top surface 24 of the board 20 with the longitudinal vertical side face 164 thereof abutted against the longitudinal vertical side face 284 of the other of the interior blocks 156 and the input/output pad surrounding the opening defined in the bottom surface 160 of the block 154 by the through-hole 178 seated against another RF signal input/output pad (not show) defined in the top surface of the board 20 which in turn is coupled to the RF TX signal transmission line 54 on the bottom surface 22 of the board 20.

Additionally, the respective blocks 152, 154 and 156 are coupled together to form the RF RX signal transmission waveguide filter assembly 300, not shown in phantom in FIG. 1 but understood to include the same phantom elements as shown in phantom for the TX filter 200 in FIG. 1 and FIGS. 3-5, in a manner wherein: the end RF Input/output block 154 is seated on the top surface 24 of the board 20 in a relationship normal and spaced from the opposed longitudinal side edge 28 of the board 20 with the input/output pad surrounding the opening defined in the bottom surface 160 of the block 154 by the through-hole 178 seated against the respective input/output pad (not shown) defined in the top surface 24 of the board 20 which in turn is coupled to the RF antenna transmission line 46 on the bottom surface 22 of the board 20; the one of the interior blocks 156 is seated on the top surface 24 of the board 20 with the longitudinal vertical side face 206 thereof abutted against the longitudinal vertical side face 164 of the end block 154 with the window 185 on the one of the interior blocks 156 abutted against the window 185 on the end block 154; the other of the interior blocks 156 seated on the top surface 24 of the board 20 with the longitudinal vertical side face 208 thereof abutted against the longitudinal vertical side face 208 of the one of the interior blocks 156 with the slit 214 on the one of the interior blocks 156 in alignment with the slit 214 on the other of the interior blocks 156 and the window 185 on the one of the interior blocks 156 in alignment and abutted against the window 185 on the other of the interior blocks 156; and the opposed end RF signal input/output block 152 seated against the top surface 24 of the board 20 with the longitudinal vertical side face 162 thereof abutted against the longitudinal vertical side face 284 of the other of the interior blocks 156 and the input/output pad surrounding the opening defined in the bottom surface 160 of the block 152 by the through-hole 178 seated against another RF signal input/output pad (not show) defined in the top surface of the board 20.

The RF TX signal is thus adapted for transmission successively from a mother board (not shown) in a wireless infrastructure assembly through the RF TX signal transmission line 54 on the bottom surface 22 of the board 20; through the through-hole 38 in the board 20; into and through the through-hole 178 in the step 172 of the block 154 of the TX waveguide filter assembly 200; successively through the end block 154, the two interior blocks 156, and the opposed end block 152 in the generally serpentine pattern shown in FIG. 1 and, more specifically, through the respective resonant sections 180, 182, 220, and 222, RF signal bridges 184 and 224, and RF signal transmission windows 185 of the respective blocks 154, 156, and 152; then through the through-hole 178 defined in the step 172 of the block 152; through the through-hole 34 defined in the board 20; through the RF antenna transmission line 44 defined on the bottom surface 22 of the board 20; and into the antenna input/output (not shown) of the mother board (not shown).

The RF RX signal is adapted for transmission successively from the antenna input/output (not shown) on the motherboard (not shown) through the RF RX signal transmission line 46 on the bottom surface 22 of the board 20; through the through-hole 36 in the board 20; through the through-hole 178 in the step 172 of the end block 154 of the RX waveguide filter assembly 300; successively through the end block 154, the two interior blocks 156, and the opposed end block 152 of the RX waveguide filter assembly 300 in the general serpentine pattern as also shown in FIG. 1 and, more specifically, through the respective resonant sections 180, 182, 220, and 222, RF signal bridges 184 and 224, and RF signal transmission windows 185 of the respective blocks 154, 156, and 152; through the through-hole 178 in defined in the step of the block 152 of the RX waveguide filter assembly 300; through the through-hole 40 defined in the board 20; through the RF RX transmission line 56 defined on the bottom surface 22 of the board 20; and then into RF RX port of the mother board (not shown).

Thus, in the embodiment shown, the respective RF waveguide TX and RX filter assemblies 200 and 300 are located and mounted on the board 20 in a spaced apart and parallel relationship to each other and extend along the board 20 in the same direction and orientation as the opposed longitudinal edges 26 and 28 and the longitudinal axis of the board 20. Also, in the embodiment shown, the end blocks 152 and 154 are longer than the interior blocks 156 of the respective waveguide filter assemblies 200 and 300.

Further, and although not shown in any of the FIGURES, it is understood that depending upon the particular application, each of the waveguide filter assemblies 200 and 300 could include only one interior block 156 or more than two interior blocks 156; that each of the blocks 152, 154, and 156 could include additional slits configured and located in a manner to create respective blocks 152, 154, and 156 with more than two resonant sections; and that the size of the blocks 152, 154, and 156 can be varied.

Figure 6:
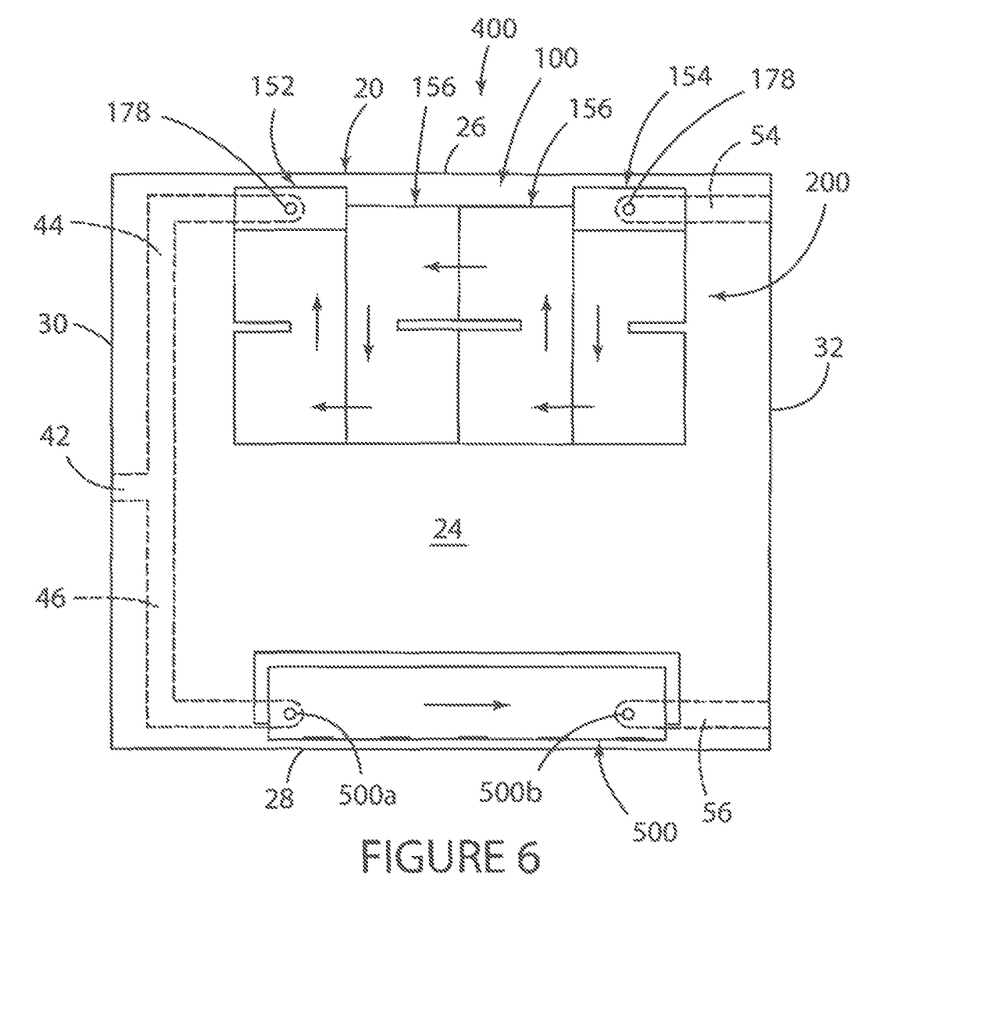
FIG. 6 is an enlarged top plan view of another embodiment of an RF duplexer waveguide filter module in accordance with the present invention incorporating an RF waveguide TX filter and an RF monoblock RX filter.

FIG. 6 depicts a second embodiment of a radio-frequency (RF) duplexer dielectric ceramic waveguide filter module 400 which is similar in structure and function to the waveguide filter module 100 except that the RX waveguide filter assembly 300 has been substituted with a radio-frequency (RF) RX dielectric ceramic monoblock filter 500.

In view of the above, the description above with respect to the structure, function, and operation of the module 100 including the description of the structure, function, and operation of the substrate 20 and the TX waveguide filter assembly 200 is incorporated herein by reference with respect to structure, function, operation, and placement of the TX waveguide filter assembly 200 on the substrate or board 20 of the waveguide filter module 400.

The monoblock filter 500 is a suitable monoblock bandpass filter of standard monoblock construction as shown and described in for example U.S. Pat. No. 4,829,274, the disclosure and description of which is incorporated herein by reference.

Specifically, and as shown in FIG. 6, the RF RX signal is adapted for transmission through the RF RX transmission line 46 on the board 20, then through the board 20 and into the monoblock filter 500 via the RF input/output through-hole 500a defined in the interior of the monoblock filter 550, then through the length of the monoblock filter 550, then through the input/output through-hole 500b defined in the opposed end of the monoblock filter 500, then back through the board 20, and through the RF RX transmission line 56 on the board 20.

In the embodiment of FIG. 6, the monoblock filter 500 is seated on the top surface 24 of the board 20 in a relationship spaced, adjacent, and parallel to the longitudinal side edge 28 of the board 20 and further in a relationship spaced and parallel and opposed to the RF TX waveguide filter 200 that is mounted on the board 20 in a relationship spaced, adjacent, and parallel to the opposed longitudinal side edge 26 of the board 20 and thus in the embodiment shown the RF RX monoblock filter 500 and RF TX waveguide filter 200 are located on opposite halves and sides of the longitudinal axis of the board 20.

Figure 7:
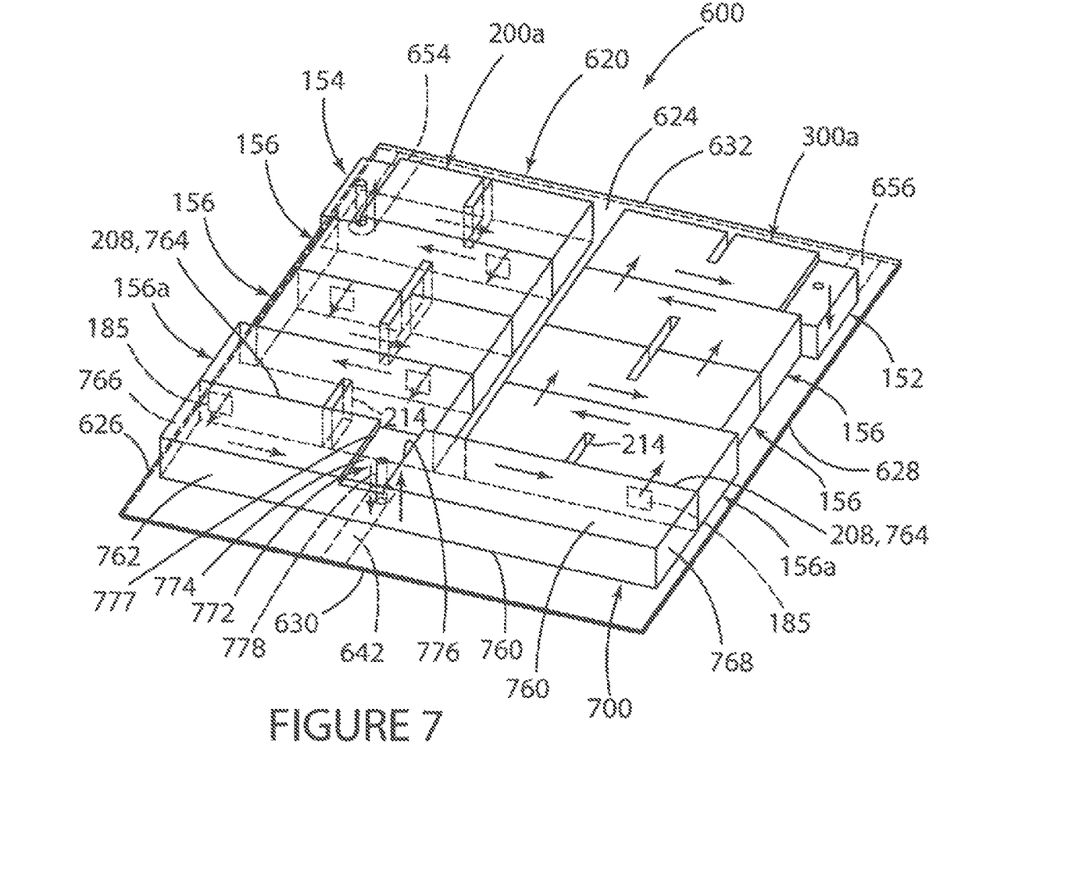
FIG. 7 is an enlarged perspective part phantom view of a further embodiment of an RF duplexer waveguide filter module in accordance with the present invention incorporating TX and RX waveguide filters and a coupling antenna RF signal transmission monoblock.

FIG. 7 depicts a third embodiment of a radio-frequency (RF) duplexer dielectric ceramic waveguide filter module 600 that: incorporates an RF TX signal transmission waveguide filter 200a identical in structure and function to the RF TX signal transmission waveguide filter 200 except that the end waveguide filter block 152 has been substituted with an RF waveguide filter block 158a; incorporates an RF RX transmission waveguide filter 300a identical in structure and function to the RF RX signal transmission waveguide filter 300 except that the waveguide filter block 154 has been substituted with a duplicate of the waveguide filter block 158a; and the substrate 620 is similar in structure and function to the substrate 20 except that the RF TX and RX signal transmission through-holes 34 and 36 and the respective RF TX and RX signal transmission lines 44 and 46 defined in the substrate 20 have been substituted with an RF antenna signal transmission through-hole (not shown) extending through the body of the substrate 620, an RF antenna signal transmission line 642 on the lower surface of the substrate 620, and an RF dielectric ceramic waveguide transmission line or filter or block 700 that is mounted on the top exterior surface 624 of the substrate 620 and extends between and couples the RF TX and RX waveguide filters 200a and 300a to the RF antenna signal transmission through-hole (not shown) and RF antenna signal transmission line 642.

As a result, the earlier description of the structure and function of the blocks 152, 154, and 156 and the earlier description of the structure, function, operation, and placement of the respective TX and RX filters 200 and 300 is incorporated herein by reference with respect to the structure, function, operation, and placement of the blocks 152, 154, and 156, RF TX signal transmission filter 200a, and RF RX signal transmission filter 300a on the board 620 of the RF duplexer module 600 shown in FIG. 7 except as otherwise described below in more detail.

Each of the RF waveguide filter blocks 158a is identical in structure, function, and operation to the RF waveguide filter block 158 of the module 10 except that each of the RF waveguide filter blocks 158a is longer than the RF filter block 158 and thus the earlier description of the structure, function, and operation of the RF waveguide filter block 158 is incorporated herein by reference with respect to the structure and function of the RF waveguide filter block 158a.

The RF dielectric ceramic waveguide filter or RF dielectric ceramic waveguide signal transmission line or block 700 is made from an elongate generally parallelepiped shaped solid block of dielectric ceramic material that includes a pair of opposed exterior bottom and top horizontal faces or surfaces 760, a pair of opposed longitudinal exterior side vertical faces or surfaces 762 and 764, and a pair of transverse end exterior side vertical faces or surfaces 766 and 768.

The exterior top face or surface 760 of the block 700 includes and defines a recess or groove or step 772 which, in the embodiment shown, comprises a portion of the block 700 from which a section or layer of dielectric ceramic material is absent or has been removed from the top exterior face or surface 762 of the block 700. In the embodiment shown, the generally rectangular shaped recess or groove 772 extends the full width of the block 700 in a relationship generally normal to and cutting through the opposed longitudinal side exterior surfaces 762 and 764, includes a horizontal surface or face 774 spaced from the top exterior surface 762 of the block 700, and terminates in a pair of vertical faces or surfaces 776 and 777 also extending the full width of the block 700 in a relationship generally normal to and cutting through the opposed longitudinal side exterior surfaces 762 and 764.

Stated another way, the recess or groove or step 772 comprises a stepped in or recessed region or portion of the block 700 having a height less than the height of the remainder of the block 700.

Further, and although not shown, it is understood that the recess or groove or step 772 could likewise comprise a step out or dome portion or region of the block 700 having a height greater than the height of the remainder of the block 700.

The block 700 further includes and defines an RF antenna signal input/output through-hole 778 extending through the interior of the block 700. The through-hole 778 is located in the groove or step 772 and is oriented in a relationship generally normal with the bottom and top exterior surfaces 760 of the block 700 and terminates in respective openings in the surface 774 of the groove or step 770 and the bottom exterior surface 760 of the block 700.

All of the external surfaces of the block 700 and the internal surfaces of the RF signal transmission input/output through-hole 778 are covered with a suitable conductive material, such as for example silver, with the exception of an uncoated (exposed ceramic) region (not shown) on the bottom block surface 760 which surrounds a coated region surrounding the opening defined in the bottom block surface 760 by the through-hole 778 and respective uncoated (exposed ceramic) regions or windows on the longitudinal side face or surface 764 of the block 700.

Specifically, the longitudinal side surface 764 of the block 700 includes a pair of generally square shape uncoated (exposed ceramic) regions defining a pair of internal RF signal transmission windows 185. The windows 185 are located at opposite ends of the block 700 adjacent and spaced from the respective transverse side surfaces 766 and 768 of the RF waveguide signal transmission block 700.

The block 700 is seated on the substrate 620 in a relationship normal to the opposed longitudinal side edges 626 and 628 and the longitudinal axis of the substrate 620 and spaced from and parallel and adjacent the transverse side edge 630 with the RF antenna signal transmission through-hole 778 therein positioned in a co-linear and coupled relationship with the RF antenna signal transmission through-hole (not shown) defined in the substrate 620 and with the windows 185 on the longitudinal side surface 764 of the block 700 in alignment with and abutting against the respective windows 185 defined in the respective vertical side faces of the respective RF waveguide blocks 158a.

Each of the respective TX and RX filters 200a and 300a is coupled to the longitudinal vertical side surface 764 of the block 700 in a relationship wherein the longitudinal vertical side face 208 and the slit 214 of the respective blocks 156a of each of the respective TX and RX filters 200a and 300a is abutted against the longitudinal vertical side surface 764 of the block 700 and the respective windows 185 located at opposed ends of the longitudinal vertical side surface 764 of the block 700 are abutted against the respective windows 185 on the longitudinal vertical side face 208 of the respective blocks 156a of the respective TX and RX signal transmission waveguide filters 200a and 300a to allow for the transmission of the RF signal between the block 700 and the respective TX and RX filters 200a and 300a.

Thus, in the embodiment of FIG. 7, the TX and RX signal transmission filters 200a and 300a, with certain of the interior structure of the TX filter 200a and RX filter 300a shown in FIG. 7 in phantom for illustration purposes, are situated and mounted on the top surface 624 of the substrate 620 in a spaced apart and parallel relationship relative to each other and the longitudinal side edges 626 and 628 of the substrate 620 and are coupled and extend generally normally outwardly from the block 700 so that the block 700 and the block filters 200a and 300a in combination form a generally U-shaped combination of block filters on the surface of the substrate 620.

The module 600 is similar in function to the module 10, and thus the earlier description of the module 100 is incorporated herein by reference, except that the respective RF TX and RX signals are now additionally adapted for transmission as depicted by the arrows in FIG. 7 through the respective RF TX and RX waveguide filter modules 200a and 300a, through opposed portions of the elongate RF waveguide signal transmission line or block 700 and through the respective coupled RF antenna signal transmission through-holes defined in the fitter 700 and the substrate 620 respectively.

Figure 8:
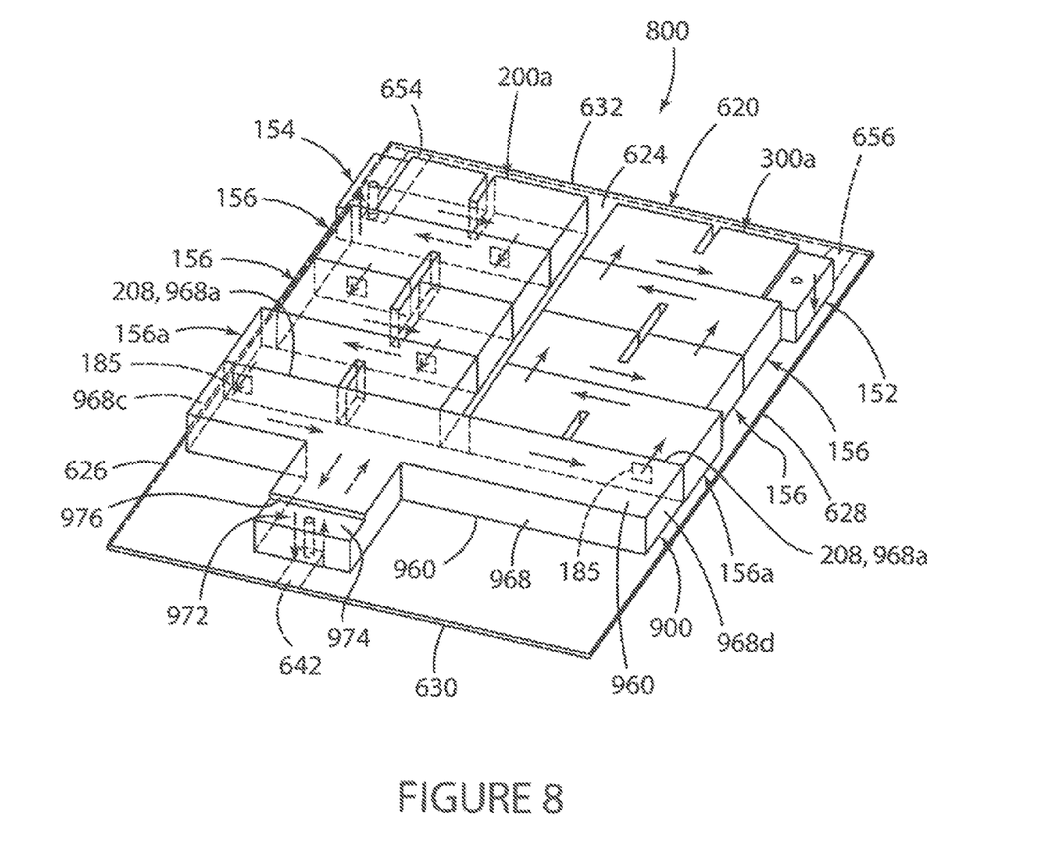
FIG. 8 is an enlarged perspective view part phantom view of a still further embodiment of an RF duplexer waveguide filter module in accordance with the present invention incorporating TX and RX waveguide filters and another embodiment of a coupling antenna RF signal transmission monoblock.

FIG. 8 depicts a fourth embodiment of a radio-frequency (RF) duplexer dielectric ceramic waveguide filter module 800 which is identical in structure, function, and operation to the waveguide filter module 600 except that the elongate RF waveguide transmission line or block 700 has been substituted with a generally T-shaped RF waveguide transmission line or filter or block 900 and thus the earlier description of the structure, function, operation, and placement of the substrate 620, the RF TX and RX signal transmission waveguide filters 200a and 300a on the substrate 620, and the block 700 on the substrate 620 of the module 600 is incorporated herein by reference with respect to the structure, function, operation, and placement of the substrate 620, the RF TX and RX signal transmission waveguide filters 200a and 300a on the substrate 620, and the block 900 on the substrate 620 of the module 800.

The substrate 620 in FIG. 8 differs only from the substrate 620 in FIGURE in regard to the placement of the RF antenna signal transmission through-hole (not shown) in the substrate 620 of FIG. 8 to accommodate the placement of the T-shaped ceramic transmission line or filter or block 900.

The T-shaped RF dielectric ceramic waveguide filter or RF dielectric ceramic waveguide signal transmission line or block 900 is made from a generally parallelepiped shaped solid block of dielectric ceramic material that includes a pair of opposed exterior bottom and top horizontal faces or surfaces 960 and a circumferentially extending exterior side vertical surface 968.

The exterior top face or surface 960 of the block 900 includes and defines a recess or groove or step 972 which, in the embodiment shown, comprises a portion of the base of the T-shaped block 900 from which a section or layer of dielectric ceramic material is absent or has been removed from the top exterior face or surface 960 of the block 900.

In the embodiment shown, the generally rectangular shaped recess or groove or step 972 is located and defined and extends along the transverse edge of the base portion of the T-shaped waveguide filter 900. More specifically, the recess or groove or step 972 extends the full width of the block 900 in a relationship generally normal to and cutting through the vertical side surface 968, includes a horizontal surface or face 974 spaced from the top exterior surface 962 of the block 900, and terminates in a vertical face or surface 976 also extending the full width of the block 900 in a relationship generally normal to and cutting through the vertical side surface 968.

Stated another way, the recess or groove or step 972 comprises a stepped in or recessed region or portion of the block 900 having a height less than the height of the remainder of the block 900.

Further, and although not shown, it is understood that the recess or groove or step 900 could likewise comprise a step out or dome or raised portion or region of the block 900 having a height greater than the height of the remainder of the block 900.

The block 900 further includes and defines an RF antenna signal transmission input/output through-hole 978 extending through the interior of the block 900. The through-hole 978 is located in the groove or step 972 and is oriented in a relationship generally normal with the bottom and top exterior surfaces 960 of the block 900 and terminates in respective openings in the surface 974 of the groove or step 970 and the bottom exterior surface 960 of the block 900.

All of the external surfaces of the block 900 and the internal surfaces of the RF signal transmission input/output through-hole 978 are covered with a suitable conductive material, such as for example silver, with the exception of an uncoated (exposed ceramic) region (not shown) on the block surface 960 which surrounds a coated region surrounding the opening defined in the bottom block surface 960 by the through-hole 978 and respective uncoated (exposed ceramic) regions or windows defined on the longitudinal side face portion 968a of the side surface 968 of the block 900.

Specifically, the longitudinal side vertical surface portion 968a of the block 900 includes a pair of generally square shape uncoated (exposed ceramic) regions defining a pair of internal RF signal transmission windows 1000 (FIG. 6). The windows 185 are located at opposite ends of the block 900 adjacent and spaced from the respective transverse side surface portions 968c and 968d of the side surface 968.

Each of the respective TX and RX filters 200a and 300a, with certain of the interior structure of the TX filter 200a and RX filter 300a shown in FIG. 8 in phantom for illustration purposes, is coupled to the longitudinal vertical side surface 968a of the block 900 in a relationship wherein the longitudinal vertical side face 208 and the silt 214 of the respective blocks 156a of each of the respective TX and RX filters 200a and 300a is abutted against the longitudinal vertical side surface 968a of the block 900 and the respective windows 185 located at opposed ends of the longitudinal vertical side surface 968a of the block 900 are abutted against the respective windows 185 on the longitudinal vertical side face 208 of the respective blocks 156a of the respective TX and RX signal transmission waveguide filters 200a and 300a to allow for the transmission of the RF signal between the block 900 and the respective TX and RX filters 200a and 300a.

The module 800 is similar in function to the modules 100 and 600, and thus the earlier description of the function of the modules 100 600 is incorporated herein by reference, except that the respective RF TX and RX signals are now additionally adapted for transmission through the respective RF TX and RX waveguide filter modules 200a and 300a, through opposed portions of the elongate RF waveguide transmission line or block 900 and through the respective coupled RF antenna signal transmission through-holes defined in the base of the T-shaped waveguide RF signal transmission block 900 and the substrate 620 respectively as depicted by the arrows shown in FIG. 8.

While the invention has been taught with specific reference to the embodiments shown, it is understood that a person of ordinary skill in the art will recognize that changes can be made in form and detail without departing from the spirit and the scope of the invention. The described embodiments are to be considered in all respects only as illustrative and not restrictive.

We claim:

1. An RF waveguide duplexer filter module adapted for the transmission and filtering of an RF signal comprising:

a substrate including opposed top and bottom exterior surfaces and including respective TX, RX, and antenna input/output RF signal transmission lines;

respective RF TX and RX waveguide filter assemblies mounted on the top exterior surface of the substrate and coupled to the respective TX, RX and antenna input/output RF signal transmission lines, each of the RF TX and RX waveguide filter assemblies including a plurality of blocks of dielectric material each defining at least a first slit and at least a first internal RF signal transmission window and being coupled in a side-by-side relationship wherein the internal RF signal transmission windows of the RF TX and RX waveguide filter assemblies are aligned with each other to define a generally serpentine path for the transmission of the RF signal through the respective RF TX and RX waveguide filter assemblies;

each of the RF TX and RX waveguide filter assemblies including a pair of end blocks and one or more interior blocks, one of the pair of end blocks also defining a step and a through-hole terminating in an opening in the step; and an RF antenna waveguide filter extending between the TX and RX waveguide filter assemblies and coupling the TX and RX waveguide filter assemblies to the RF antenna input/output RF signal transmission line.

2. An RF duplexer filter module for the transmission and filtering of an RF signal comprising:

a substrate defining opposed exterior top and bottom surfaces and including respective TX, RX, and antenna input/output RF signal transmission lines;

a TX filter mounted on the top surface of the substrate and extending between and coupled to the TX and antenna input/output RF signal transmission lines;

an RX filter mounted on the top surface of the substrate and extending between and coupled to the RX and antenna input/output RF signal transmission lines;

wherein at least one of the TX and RX filters is an RF waveguide filter assembly including a plurality of separate waveguide filter blocks each comprised of a solid block of dielectric ceramic material including a plurality of exterior surfaces covered with a layer of conductive material and an RF signal transmission window defined in at least one of the plurality of exterior surfaces of each of the separate waveguide filter blocks by an uncoated region of exposed dielectric material in the layer of conductive material, at least one of the plurality of exterior surfaces of each of the separate waveguide filter blocks defining a step and an RF signal transmission through-hole terminating in the step, the separate waveguide filter blocks being coupled together in a side-by-side relationship with the respective RF signal transmission windows in alignment with each other to allow the transmission of the RF signal through the plurality of waveguide filter blocks.

3. The RF duplexer filter of claim 2, wherein the plurality of separate waveguide filter blocks includes a pair of separate end RF signal input/output blocks and one or more separate interior RF signal transmission blocks which are coupled to and located between the pair of separate end RF signal input/output blocks.

4. The RF duplexer filter of claim 3, wherein each of the pair of end RF signal input/output blocks and each of the one or more interior RF signal transmission blocks defines a slot.

5. An RF duplexer filter module for the transmission and filtering of an RF signal comprising:

a substrate defining opposed exterior top and bottom surfaces and including respective TX, RX, and antenna input/output RF signal transmission lines;

a TX filter mounted on the too surface of the substrate and extending between and coupled to the TX and antenna input/output RF signal transmission lines;

an RX filter mounted on the top surface of the substrate and extending between and coupled to the RX and antenna input/output RF signal transmission lines;

wherein at least one of the TX and RX filters is an RF waveguide filter assembly including a plurality of separate waveguide filter blocks each comprised of a solid block of dielectric ceramic material and a plurality of exterior surfaces including a pair of opposed exterior side surfaces covered with a layer of conductive material and each defining an RF signal transmission window, the separate waveguide filter blocks being coupled together in a side-by-side relationship with the respective RF signal transmission windows in alignment with each other to allow the transmission of the RF signal through the plurality of waveguide filter blocks;

the plurality of separate waveguide filter blocks including a pair of end RF signal input/output blocks and one or more interior RF signal transmission blocks located between the pair of end RF signal input/output blocks;

each of the pair of end RF signal input/output blocks and each of the one or more interior RF signal transmission blocks defining a slot; and at least one of the pair of end RF signal input/output blocks defining a step and an RF signal transmission through-hole terminating in an opening in the step.

6. An RF duplexer filter module for the transmission and filtering of an RF signal comprising:

a substrate defining opposed exterior top and bottom surfaces and including respective TX, RX, and antenna input/output RF signal transmission lines;

a TX filter mounted on the top surface of the substrate and extending between and coupled to the TX and antenna input/output RF signal transmission lines;

an RX filter mounted on the top surface of the substrate and extending between and coupled to the RX and antenna input/output RF signal transmission lines;

at least one of the TX and RX filters being an RF waveguide filter;

the RF waveguide filter being an RF waveguide filter assembly including a plurality of waveguide filter blocks that have been coupled together in a relationship wherein the RF signal is transmitted through the RF waveguide filter in a generally serpentine pattern;

the plurality of separate waveguide filter blocks including a pair of end RF signal input/output blocks and one or more interior RF signal transmission blocks located between the pair of end RF signal input/output blocks;

each of the pair of end RF signal input/output blocks and each of the one or more interior RF signal transmission blocks defining a slot;

at least one of the pair of end RF signal input/output blocks defining a step and an RF signal transmission through-hole terminating in an opening in the step; and an RF antenna waveguide filter extending between the TX and RX filters and coupling the TX and RX filters to the RF antenna input/output RF signal transmission line.

7. The RF duplexer filter of claim 6, wherein the RF antenna waveguide filter defines another step and an RF signal transmission through-hole terminating in an opening in the another step.

8. The RF duplexer filter of claim 7, wherein the RF antenna waveguide filter is T-shaped and the another step of the RF antenna waveguide filter is defined in the base of the T-shaped RF antenna waveguide filter.

9. An RF waveguide filter assembly for the transmission and filtering of an RF signal comprising:
a pair of end blocks of dielectric material, each of the end blocks including opposed top and bottom exterior surfaces and opposed side exterior surfaces, at least one of the pair of end blocks of dielectric material defining a step and a through-hole terminating in an opening in the step, the pair of end blocks each also defining at least a first slit extending into one of the opposed exterior surfaces and at least a first RF signal transmission window defined in one of the opposed side exterior surfaces; and
one or more interior blocks of dielectric material, each of the interior blocks including opposed top and bottom exterior surfaces and opposed side exterior surfaces, the one or more of the interior blocks each defining a slit extending into one of the opposed exterior side surfaces of the interior block and an RF signal transmission window defined in each of the opposed exterior side surfaces,
wherein the pair of end blocks and the one or more interior blocks are coupled together in a side-by-side relationship with the respective RF signal transmission windows in alignment with each other to define a generally serpentine path for the transmission of the RF signal through the RF waveguide filter assembly.

10. The RF waveguide filter assembly of claim 9 further comprising a substrate defining respective RF signal antenna, TX, and RX transmission lines, the RF waveguide filter assembly comprising respective TX and RX waveguide filter assemblies mounted on the substrate and coupled to the RF signal antenna, TX, and RX transmission lines on the substrate and defining an RF duplexer waveguide filter module.

11. An RF waveguide duplexer filter module adapted for the transmission and filtering of an RF signal comprising:
a substrate including opposed top and bottom exterior surfaces and including respective TX, RX, and antenna input/output RF signal transmission lines; and
respective RF TX and RX waveguide filter assemblies mounted on the top exterior surface of the substrate and coupled to the respective TX, RX and antenna input/output RF signal transmission lines, each of the RF TX and RX waveguide filter assemblies including a plurality of separate blocks of solid dielectric material including a plurality of exterior surfaces including a pair of opposed exterior side surfaces covered with a layer of conductive material, one of the opposed exterior side surfaces defining at least a first slit and each of the opposed exterior side surfaces defining at least a first internal RF signal transmission window, the plurality of separate blocks of solid dielectric material being coupled to each other in a side-by-side relationship wherein the internal RF signal transmission windows of the RF TX and RX waveguide filter assemblies are aligned with each other to define a generally serpentine path for the transmission of the RF signal through the respective RF TX and RX waveguide filter assemblies, each of the plurality of separate blocks of the RF TX and RX waveguide filter assemblies including a pair of end blocks and one or more interior blocks, one or both of the respective pair of end blocks also defining a step and a through-hole terminating in an opening in the step.

12. The RF waveguide duplexer filter module of claim 11, wherein only one of the respective pair of end blocks defines a step and a through-hole, and further comprising an RF antenna waveguide filter comprising a separate solid block of dielectric material including a plurality of exterior surfaces including an exterior side surface covered with a conductive material, the exterior side surface of the block of dielectric material of the RF antenna waveguide filter defining a pair of spaced apart RF signal transmission windows, the RF antenna waveguide filter extending between and coupled to the TX and RX waveguide filter assemblies in a relationship with the pair of spaced apart RF signal transmission windows defined on the exterior side surface of the RF antenna waveguide filter in alignment with respective ones of the RF signal transmission windows of the TX and RX waveguide filter assemblies.

13. The RF waveguide filter module of claim 12, wherein the RF antenna waveguide filter defines another step and an RF signal transmission through-hole terminating in an opening in the another step.

14. The RF waveguide filter module of claim 13, wherein the RF antenna waveguide filter is T-shaped and the another step is defined in the base of the T-shaped RF antenna waveguide filter.

15. The RF waveguide duplexer filter module of claim 11, wherein both of the respective pair of end blocks define the step and the through-hole.

\* \* \* \* \*